Sept. 22, 1942.   H. C. NIELSEN   2,296,567
CABLE CLAMP
Filed June 29, 1942
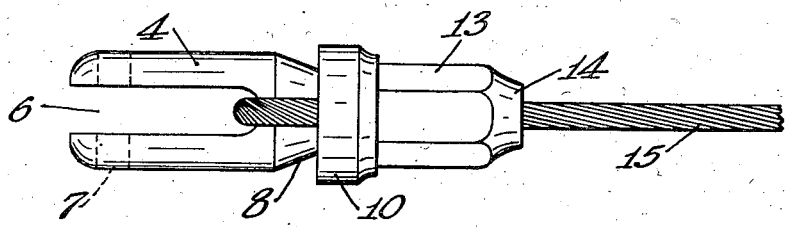
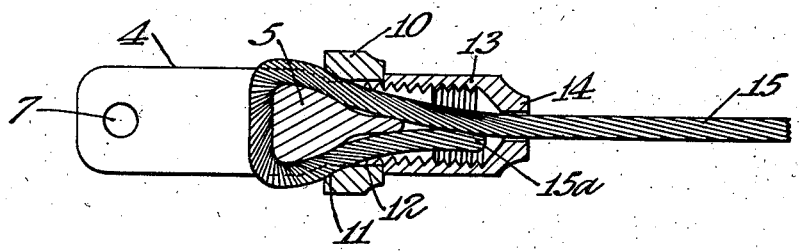
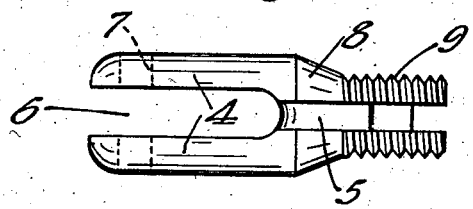
Inventor
Hakon C. Nielsen
By Williamson & Williamson
Attorneys Patented Sept. 22, 1942

2,296,567

UNITED STATES PATENT OFFICE 2,296,567

CABLE CLAMP

Hakon C. Nielsen, Minneapolis, Minn.

Application June 29, 1942, Serial No. 448,922

3 Claims. (Cl. 24—124)

This invention relates to cable clamps and is adapted to be secured to the end of the cable so that the cable can be connected with another mechanical element in such a manner that the cable is positively held against slipping. One example of the use of my clamp is in aircraft for connecting the ends of wire struts to portions of the fuselage and also to connect the ends of control cables to control operating mechanism.

It is a general object of the invention to provide a cable clamp which is simple and rugged in construction and which will positively clamp a cable so that there is no danger of slippage even under excessive vibration.

More specifically the invention resides in the provision of a wedge flanked by a pair of shanks having complementary threads on adjacent ends near said wedge and to provide a nut propelled collar movable toward the wedge to engage a cable which has been passed around said wedge and tightly clamp the cable between the collar and the wedge and to provide means incorporated in said shank for connecting them and the end of the cable to some other piece of mechanism.

These and other objects and advantages of the invention will more fully appear from the following description made in connection with the accompanying drawing, wherein like reference characters refer to the same parts throughout the views, and, in which:

Fig. 1 is a plan view of a cable clamp assembly with the cable clamped in position;

Fig. 2 is a longitudinal vertical section of the assembly through Fig. 1; and

Fig. 3 is a plan view of the shank and wedge unit of the device.

In the drawing there is illustrated a pair of parallel spaced shanks 4 connected by an integrally formed wedge member 5. In Fig. 2 it will be seen that the larger end of the wedge 5 is disposed intermediate the ends of the shanks 4 and that said wedge converges at the right-hand ends of said shanks 4 preferably terminating a short distance from the ends of said shanks. The left-hand portions of the shanks 4 have an unobstructed space 6 therebetween for a substantial distance and the extreme left-hand ends of said shanks are provided with apertures 7.

Adjacent the wedge 5 the outer portions of the shanks 4 are provided with tapered surfaces 8, the taper being toward the right-hand ends of said shanks. From the tapers 8 to the right-hand ends of the shanks 4 said ends are reduced in size as compared to the left-hand portions of the shanks and said reduced ends are provided with threads 9. It will be seen particularly in Fig. 3 that the threads 9 on the shanks 4 extend inwardly from the right-hand ends of said shanks to points approximately midway of the wedge 5. A collar 10 is fitted over the threaded shank portions 9 loosely so that it will slip easily toward the tapers 8 and wedge 5, and, as shown in Fig. 2, the collar 10 is provided with a frusto-conical bore portion 11 which communicates with the cylindrical bore 12 formed in the collar 10.

Mounted on the threaded shank ends 9 is a hexagonal nut 13 which when screwed on the threads 9 will engage one side of the collar 10 and force it toward the large end of the wedge 5. The right-hand end of the nut 13 is provided with an apertured end 14.

When a cable such as the cable 15 is to be gripped in my improved clamp the free end 15a of the cable is pushed through the apertured end 14 of the nut 13 and through the collar 10 after the nut has been backed off of the threads 9 to some extent so that the collar 10 can be pushed away from the wedge 5. As the cable end 15a is fed through the collar 10 it passes between said collar and one side of the wedge 5. It is then brought around the wedge and passed between the opposite side of wedge 5 and the collar 10, the cable end 15a finally terminating within the nut 13. Then said nut 13 is screwed upon the threads 9 pushing the collar 10 to the left toward the wedge 5. This movement is continued until said collar 10 engages the portions of the cable 15 lying between the collar and the wedge 5 and as the nut is tightened the collar 10 firmly grips the cable between itself and said wedge, making it impossible for the cable to be withdrawn until the nut 13 is loosened and the collar 10 backed away from the wedge. Said collar 10 is provided with the frusto-conical bore portion 11 so that it will have more cable engaging surface and will not cut into the cable when the device is tightened up as it would if there were a sharp corner at the left-hand portion of the bore 12 which runs through said collar 10.

It can readily be seen that the left-hand ends and central portions of the shanks 4 are spaced and that space is unobstructed between them so that the cable can readily be looped about the wedge 5 and also in order that the left-hand ends of the shank portions 4 can conveniently be connected to a lever, rod or other suitable element by means of a bolt passing through the apertures 7 and through the rod or other element to which the clamp is to be connected.

From the foregoing description it will be seen that I have provided a cable clamp or connector which is simple yet strong in construction and which will positively grip the end of a cable in such a manner that vibration and strains will not loosen or dislodge the cable and wherein the clamp is so constructed that it forms a ready connector between the end of the cable and some other mechanical element. The nut 13 will not become loosened since the collar 10 will tend to deform the cable slightly where it engages the same and there is a constant back pressure against the nut so that the slightly yieldable cable functions somewhat in the manner of a lock washer.

It will, of course, be understood that various changes may be made in the form, details, arrangement and proportions of the various parts without departing from the scope of my invention.

What is claimed is:

1. A cable clamp comprising, a pair of divided shank portions having complementary threads to receive a nut, a wedge interconnecting said divided shank portions, said wedge having its broad end located between the ends of said shank portions, and converging toward adjacent ends of said shank portions, a collar loosely fitting about said shank portions, and a nut engaging said threaded shank portions, whereby a cable passing through said nut and collar can be looped about said wedge between said shank portions and said nut can be drawn up against said collar to tightly clamp a cable between said collar and said wedge.

2. A cable clamp comprising, a pair of divided shank portions having complementary threads at one end to receive a nut, a wedge interconnecting said divided shank portions, said wedge having its broad end located between the ends of said shank portions and converging toward and terminating between the threaded ends of said shank portions, said shank portions having complementary tapers adjacent the broad end of said wedge and tapering toward said threaded shank portions, a collar loosely fitted about said threaded shank portions and slidable thereon towards said wedge and complementary tapers, and a nut on said threaded shank portions and adapted to engage and move said collar toward said wedge and complementary tapers, whereby a cable passing through said nut and collar can be looped about said wedge between said shank portions and be tightly clamped between said wedge and collar.

3. A cable clamp comprising, a pair of divided shank portions having complementary threads on adjacent ends, a wedge interconnecting said dividing shank portions, said wedge having its broad end located intermediate the ends of said shank portions and converging to the threaded ends thereof, the spaces between the remainders of said shank portions and their opposite ends from said threaded ends being unobstructed, a nut engaging the threads of said shank portions, and a collar loosely fitting the threaded ends of said shank portions and movable toward said wedge, whereby a cable passing through said nut and collar can be looped about said wedge between said shank portions and said nut can be drawn up against said collar to tightly clamp a cable between said collar and said wedge.

HAKON C. NIELSEN.